United States Patent
Feng et al.

(10) Patent No.: US 9,069,762 B2
(45) Date of Patent: Jun. 30, 2015

(54) EQUIVALENCE CLASSES OVER PARAMETER STATE SPACE

(75) Inventors: Xiushan Feng, Austin, TX (US); Yinfang Lin, Austin, TX (US); Jayanta Bhadra, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 453 days.

(21) Appl. No.: 13/531,317

(22) Filed: Jun. 22, 2012

(65) Prior Publication Data

US 2013/0346375 A1 Dec. 26, 2013

(51) Int. Cl.
*G06F 17/50* (2006.01)
*G06F 17/30* (2006.01)

(52) U.S. Cl.
CPC ........................................ *G06F 17/30* (2013.01)

(58) Field of Classification Search
CPC ............ G06F 17/5045; G06F 2217/04; G06F 2217/68; G06F 17/5022; G06F 1/26; G06F 17/30386; G06F 17/3056; G06F 17/5081; G06F 12/0817; G06F 12/0833; G06F 13/1605; G06F 17/30; G06F 2217/86; G06F 9/05
USPC .................................................. 716/112–120
See application file for complete search history.

(56) References Cited

U.S. PATENT DOCUMENTS

2005/0257179 A1* 11/2005 Stauffer et al. .................... 716/3
2008/0216038 A1* 9/2008 Bose ................................. 716/8

OTHER PUBLICATIONS

Aharoni et al., "FPgen—A Test Generation Framework for Datapath Floating-Point Verification," IEEE International High Level Design Validation and Test Workshop 2003, Nov. 2003, 6 pages.
Brand, "Verification of Large Synthesized Designs," Proceedings of the 1993 IEEE/ACM International Conference on Computer-Aided Design, Nov. 1993, pp. 534-537.
Burnstein, "Practical Software Testing," Springer-Verlag New York, Inc., 2003, pp. i-xxii and 61-96.
Ip et al., "Better Verification Through Symmetry," Formal Methods in System Design, vol. 9, Nos. 1/2, Aug. 1996, pp. 1-34.
Ochsenschlager et al., "Abstraction Based Verification of a Parameterised Policy Controlled System," International Conference "Mathematical Methods, Models and Architectures for Computer Networks Security," Sep. 2007, 14 pages.
Talupur, "Abstraction Techniques for Parameterized Verification," Thesis, Carnegie Mellon University, Nov. 2006, pp. i-x and 1-14.

* cited by examiner

*Primary Examiner* — Binh Tat

(57) ABSTRACT

An approach is provided in which an equivalence class generator selects a configurable module that includes control points and configuration parameters. The configuration parameters define a parameter state space of the configurable module. The equivalence class generator utilizes the control points to generate equivalence classes, which include class representatives that indicate values for the configuration parameters. Next, one of the class representatives are selected and verified from each of the equivalence classes. In turn, the verification of the class representatives verifies the parameter state space of the configurable module.

20 Claims, 9 Drawing Sheets

EQUIVALENCE CLASSES OVER PARAMETER STATE SPACE

TECHNICAL FIELD

The present disclosure relates to identifying and utilizing equivalence classes to improve verification of a configurable module.

BACKGROUND

System designers utilize synthesizable modules in system on a chip (SOC) designs for various reasons, such as for design reuse, cost savings, and reduced time to market. The synthesizable modules may be "configurable" by including parameters that allow the system designer to customize particular functions within the module in order to meet system requirements, such as a processor's bus size, counter size, etcetera. As such, a module supplier that provides configurable modules is responsible for verifying functionality over the range of selectable parameters.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
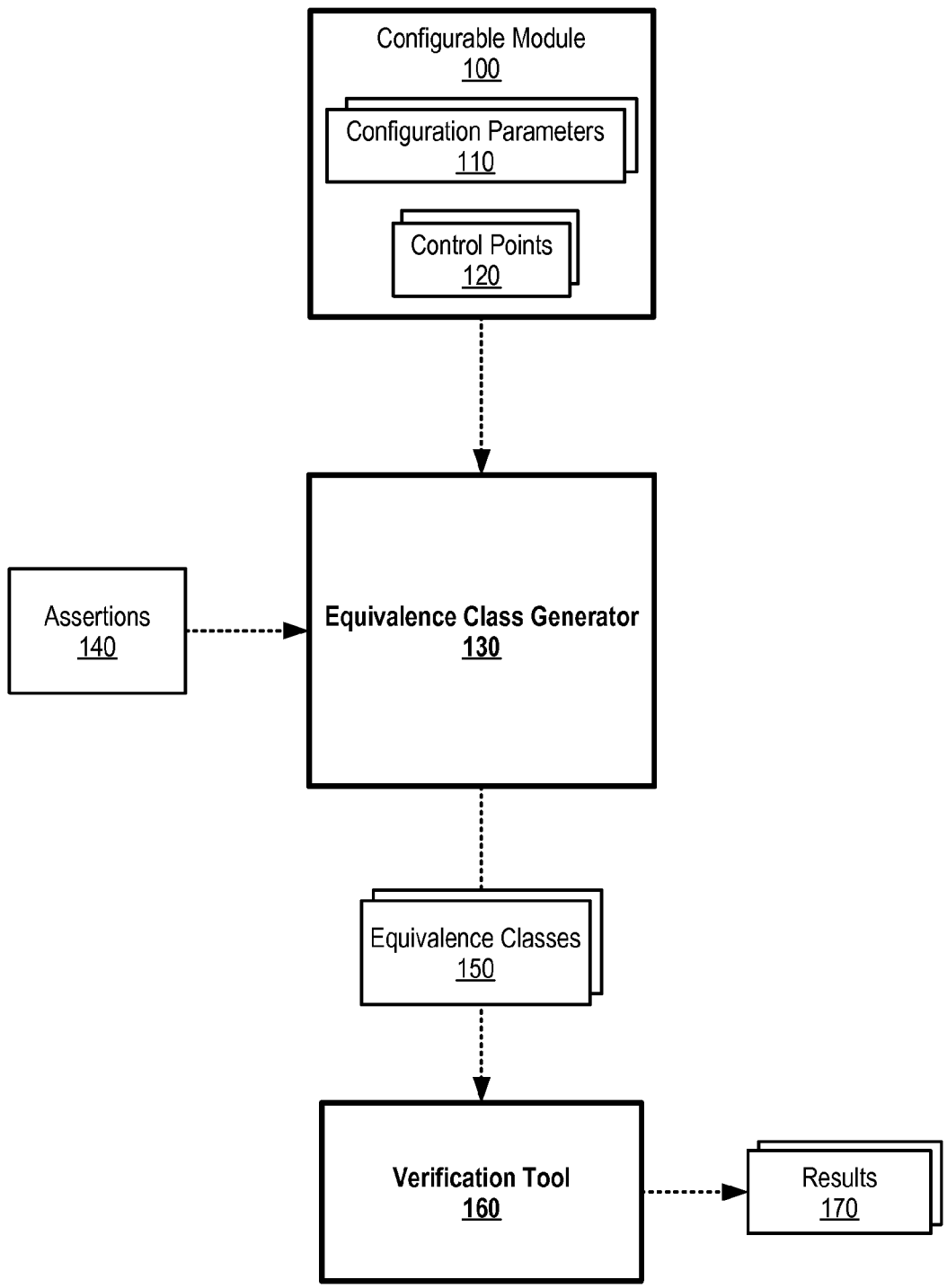
FIG. 1 is an exemplary diagram showing an equivalence class generator generating equivalence classes for a configurable module and a verification tool utilizing the generated equivalence classes to verify the configurable module.

This disclosure includes embodiments that reduce the amount of time to verify a configurable module's parameter state space. An equivalence class generator identifies a configurable module's control points and configuration parameters. The configuration parameters define a parameter state space of the configurable module, and the control points are points within the configurable module whose outcome is dependent upon one or more variables. The equivalence class generator utilizes the control points to generate equivalence classes that include class representatives indicating values for the configuration parameters. In turn, the equivalence class generator selects and verifies one of the class representatives from each of the equivalence classes, thus verifying the parameter state space of the configurable module.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is an exemplary diagram showing an equivalence class generator generating equivalence classes for a configurable module and a verification tool utilizing the generated equivalence classes to verify the configurable module.

Configurable module 100 includes configuration parameters 110 and control points 120. In one embodiment, configurable module 100 may be a synthesizable RTL (register-transfer level) module such as a processor core, a bus, a counter, etc. In this embodiment, configurable module 100 may be supplied by a module supplier to a system designer for the system designer to integrate into an SOC design.

Configuration parameters 110 are variables that, in one embodiment, the system designer configures during a design stage. The module supplier is not necessarily aware of the system designer's requirements. Therefore, the module supplier is required to verify operability of each parameter combination (e.g., parameter state space) that is available to the system designer. For example, configurable module 100 may be a multi-core module that includes four configuration parameters 110, such as a number of cores (1 to 8), a number of threads (1 to 4), an address width size (32 or 40), and a cache size selection (512K or 1M). In this example, the possible parameter combinations are 8×4×2×2=128. To avoid verifying each parameter combination, embodiments of the present disclosure group the different parameter combinations into equivalence classes (discussed below) in order to reduce the amount of effort to verify the configurable module 100's parameter state space.

Control points 120 are points (e.g., conditions, variables, etc.) within configurable module 100 whose outcome is dependent upon one or more variables. In one embodiment, control points 120 may include "if" statements from which recursive functions are generated, such as the example shown in FIG. 2. In another embodiment, control points 120 may include "generate" statements, such as when configurable module 100 is a System Verilog module.

Equivalence class generator 130 analyzes configuration parameters 110 and control points 120 to generate equivalence classes 150. In one embodiment, equivalence class generator 130 uses assertions 140 to further refine equivalence classes 150 (see FIG. 6 and corresponding text for further details). In another embodiment, equivalence classes 150 may be generated according to functionality or verification goals. In this embodiment, equivalence classes 150 may be defined under an equivalence property (or behavior), p, of configurable module 100's corresponding circuit. When $p(a)=p(b)$, then a is equivalent to b, where a and b are two different configurations of parameters. In this embodiment, two equivalence classes are either equal or disjoint, which relates to partitioning configurable module 100's parameter state space into parameter state sub-spaces (see FIGS. 2, 3, and corresponding text for further details).

In one embodiment, equivalence class generator 130 generates a dependency diagram to generate equivalence classes 150. In this embodiment, the dependency diagram identifies input nodes (corresponds to configuration parameters 110), output nodes (corresponds to configuration module 100's outputs), and edges (corresponds to control points 120) that link the input nodes to the output nodes (e.g., dependencies, see FIGS. 3, 5, and corresponding text for further details). In one embodiment, instead of or in addition to generating a dependency diagram, equivalence class generator 130 may generate a dependency table or some other mechanism to associate configuration parameters 110 to output signals.

Verification tool 160 receives equivalence classes 150 and selects a class representative from each of equivalence classes 150, forming a set of class representatives. A set of class representatives includes one class member from each of equivalence classes 150. Verification tool 160 verifies the set of class representatives that, in turn, verifies configurable module 100's parameter state space (results 170). This is due to the fact that, by the definition of equivalence classes, when a class representative passes the verification, then each member of the same equivalence class passes the verification.

Figure 2:
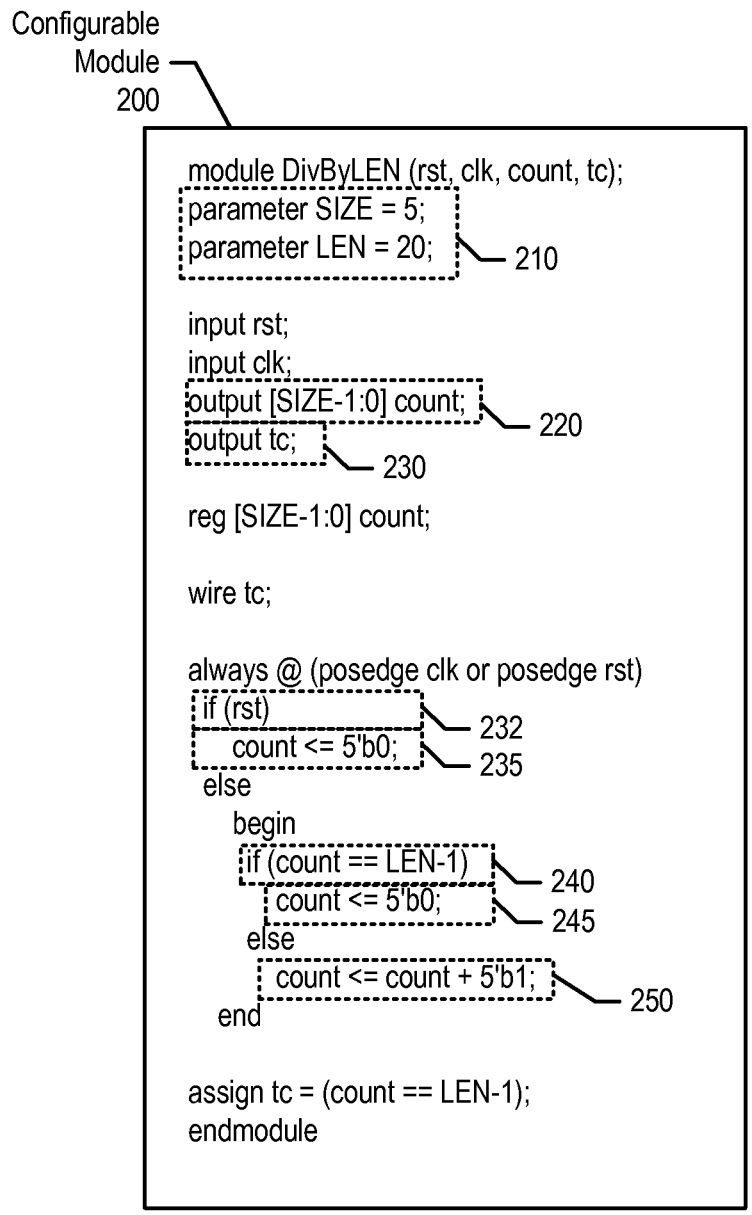
FIG. 2 is an exemplary diagram showing a configurable module that generates a divide-by circuit (e.g., a counter), which may be integrated into a system design.

FIG. 2 is an exemplary diagram showing a configurable module that generates a divide-by circuit (e.g., a counter), which may be integrated into a system design. Configurable module 200 includes configuration parameters 210, which include a SIZE and LEN parameter. The SIZE parameter identifies the bit width of the counter and the LEN parameter identifies an upper bound of the counter. As such, the parameter state space for configurable module 200 is defined as [set of possible SIZE's]*[set of possible LEN's].

Lines 232 and 235 show that the counter resets when the counter receives an asynchronous "rst" signal. Lines 240 and 245 show that the counter also resets when the counter reaches an upper bound of "LEN-1." Since the counter output resets based upon the result of line 240's "if" statement, line 240's "if" statement is one of configurable module 200's control points.

Lines 220 and 230 show two outputs from configurable module 200. For a particular SIZE value, line 220 shows that output value of the counter may be from 0 to $2^{SIZE}-1$. Lines 240, 245, and 250 show that the reset condition partitions the configuration state space into two groups. When LEN<$2^{SIZE}$, line 240 is true and the counter counts from 0 to LEN-1. In another group when LEN>$2^{SIZE}$, line 240 is false and the counter is reset to 0 when it over-floats at an increased-by-1 step (e.g., the counter counts from 0 to $2^{SIZE}-1$).

Therefore, when LEN≤$2^{SIZE}$, one group of possible values forms (equivalence group) for SIZE and LEN, otherwise, another group of possible values forms for LEN>$2^{SIZE}$. For each equivalence class, LEN=n (n is an integer) may be constructed from the case where LEN=n-1. Both cases (n and n-1) have similar behavior and, as such, two recursive functions of the circuit may be identified. In turn, outputs of the circuit may be recursively computed from the base case of each group and the behavior of the circuit may be described by the two recursive functions.

Count(n) may be defined as a non-repeat sequence of outputs of count corresponding to clock ticks. For example, for proper divide-by behavior, count(n)=0, 1, 2, . . . , n-1; tc(n)= 0, . . . , 1, where the number of 0's seen before 1 should be n-1. Based on the relationship between LEN and SIZE, two equivalence classes are:

Class 1: count(n)=count(n-1), n-1 and tc(n)=0, tc(n-1), where LEN=n and n≤$2^{SIZE}$.

Class 2: count(n)=count(n-1)=0, 1, 2, . . . , $2^{SIZE}-1$ and tc(n)=tc(n-1)=a sequence of $2^{SIZE}$ 0's, where LEN=n and n>$2^{SIZE}$.

Based upon the definition of equivalence classes, the entire parameter state space of configurable module 200 may be verified by verifying one pair of SIZE and LEN values inside of equivalence class 1 and equivalence class 2. In one embodiment, equivalence class generator 130 generates dependency diagrams to identify equivalence classes (see FIGS. 3, 6, and corresponding text for further details).

Figure 3:
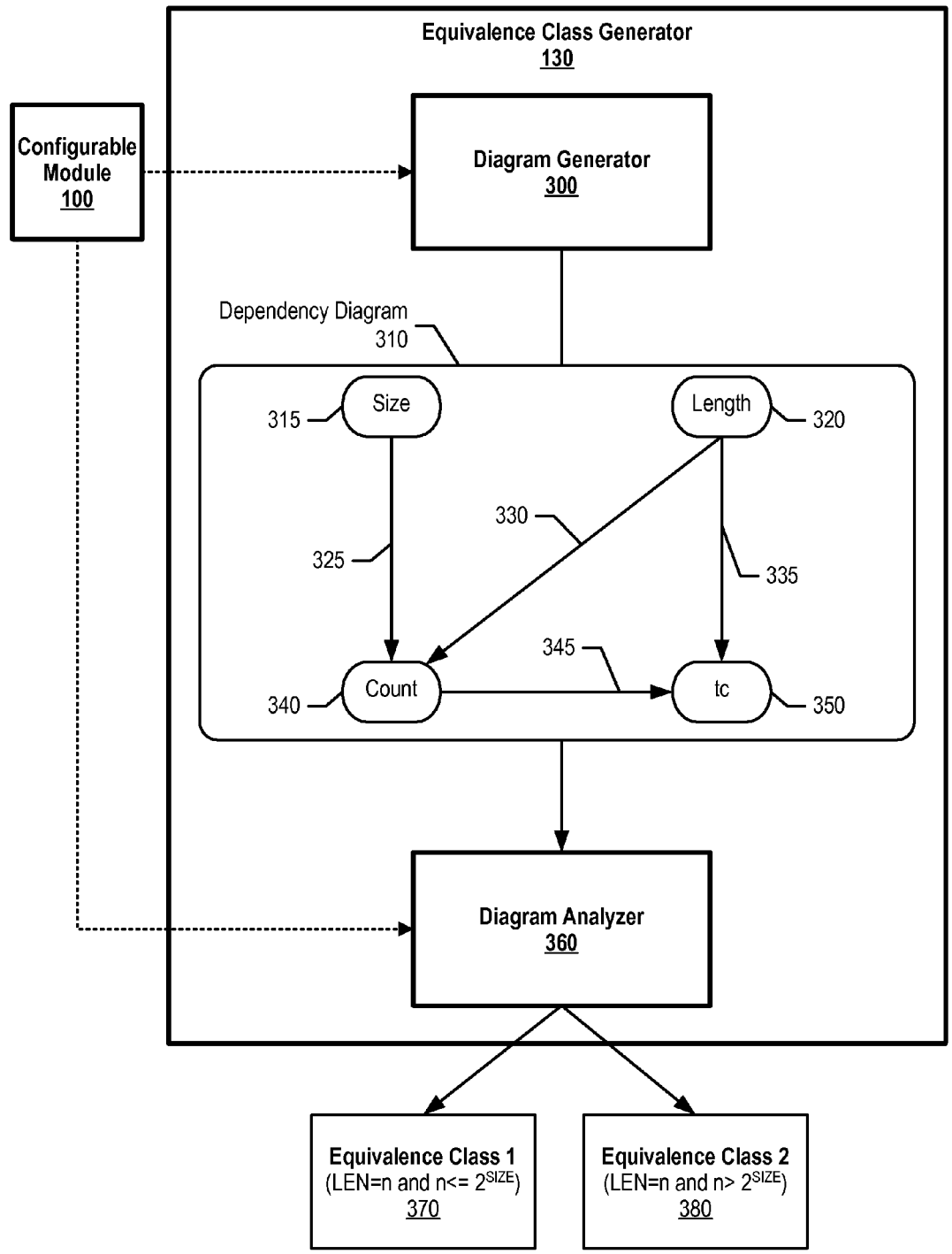
FIG. 3 is an exemplary diagram showing an equivalence class generator creating a dependency diagram for a configurable counter module and utilizing the dependency diagram to generate equivalence classes.

FIG. 3 is an exemplary diagram showing an equivalence class generator creating a dependency diagram for a configurable counter module and utilizing the dependency diagram to generate equivalence classes. In one embodiment, equivalence class generator 130 includes diagram generator 300, which generates dependency diagram 310 based upon configuration parameters and control points included in configurable module 100 shown in FIG. 2.

Diagram generator 300 analyzes configurable module 100 and identifies input nodes, output nodes, and edges (control points such as if statements, generate statements, etc.). In turn, diagram generator 300 links the input nodes to the output nodes via the control points. Dependency diagram 310 includes two input nodes 315 and 320, which correspond to parameters 210 shown in FIG. 2. Dependency diagram 310 also includes two output nodes 340 and 350, which correspond to outputs 220 and 230 shown in FIG. 2.

Dependency diagram 310 includes edges 325, 330, 335, and 345. Edge 325 corresponds to line 220 in FIG. 2, which shows how the value of "Size" affects the value of "Count." Edge 330 corresponds to line 240, which shows how "Count" resets when LEN reaches a certain value. Edges 335 and 345 correspond to line 250, which shows how the output "tc" depends upon the value of LEN and COUNT, respectively. In short, each edge identifies dependencies on how a variable is updated by other variables.

Diagram analyzer 360 analyzes dependency diagram 310 and generates equivalence class 1 370 and equivalence class 2 380 accordingly. In one embodiment, diagram analyzer 360 may symbolically compute transition relations of variables in the dependency diagram and identify recursive functions of the configuration variables. With recursive functions identified, diagram analyzer 360 proposes candidates for equivalence classes and proves the correctness of classification to ensure the candidates are truly equivalence classes. In turn, equivalence class generator 130 provides equivalence class 1 370 and equivalence class 2 380 to verification tool 160 for configurable module 100's verification over its parameter state space (see FIG. 7 and corresponding text for further details).

Figure 4:
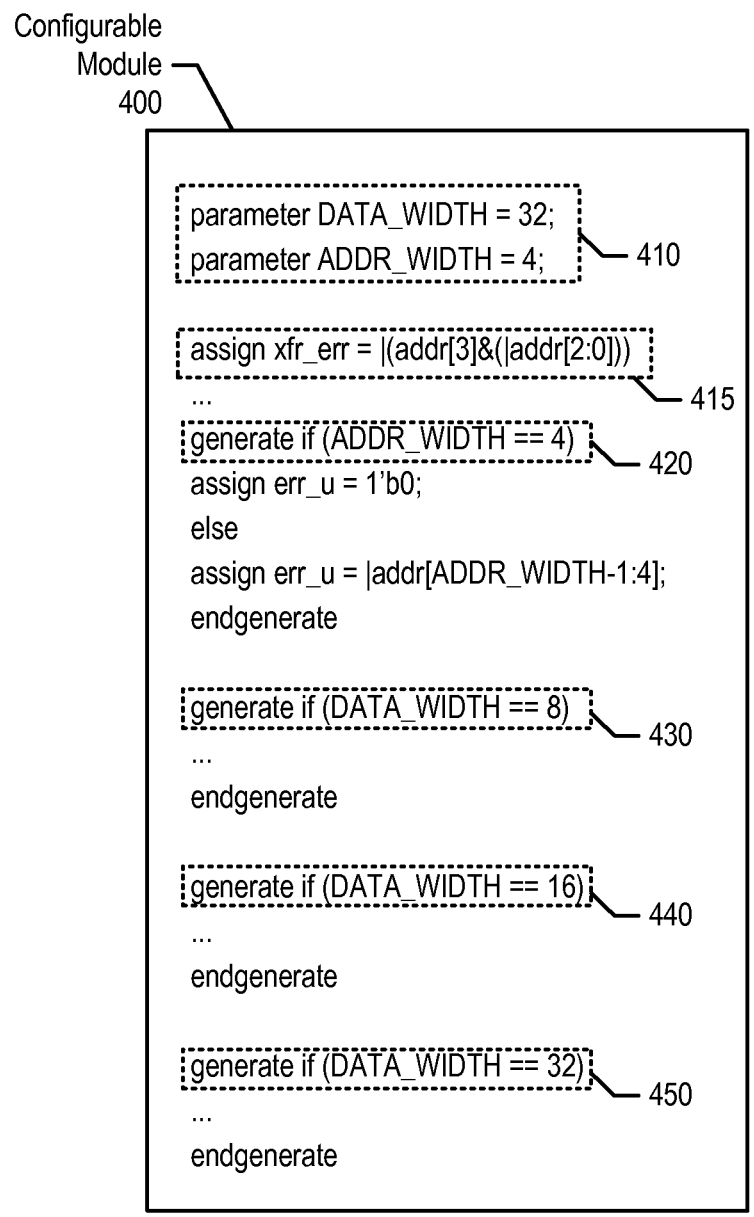
FIG. 4 is an exemplary diagram showing a configurable module that generates a programmable CRC (Cyclic Redundancy Check) circuit.

FIG. 4 is an exemplary diagram showing a configurable module that generates a programmable CRC (Cyclic Redundancy Check) circuit. Configurable module 400 includes configuration parameters 410, which define bus widths for a data bus and an address bus. The example shown in FIG. 4 shows that the default width values are "32" and "4" for DATA_WIDTH and ADDR_WIDTH, respectively. In one embodiment, configurable module 400's specification may allow DATA_WIDTH selections of 8, 16, or 32 bits with minimal restrictions on ADDR_WIDTH values. As such, the parameter state space for configurable module 400 is three times (8, 16, 32) the number of possible ADDR_WIDTH selections.

Configurable module 400 includes four control points (generate statements) at lines 420, 430, 440, and 450. These generate statements use if-else operations to conditionally create logic according to the result of the if-else operations. Line 430, 440, and 450 shows three different DATA_WIDTH value generation statements.

Line 420 shows that the generate statement is based upon whether ADDR WIDTH==4. In addition, line 415 shows that ADDR_WIDTH has a minimum requirement of 4. As such, bits greater than 5 for ADDR_WIDTH are symmetric to ADDR_WIDTH==5. Therefore, six candidate equivalence classes are generated for configurable module 400. In one embodiment, a "theorem prover module" (inside diagram analyzer 360) proves that, inside each class, outputs may be constructed recursively and the properties hold for each member:

PCRC #(.ADDR_WIDTH(4), .DATA_WIDTH(8))
PCRC #(.ADDR_WIDTH(4), .DATA_WIDTH(16))
PCRC #(.ADDR_WIDTH(4), .DATA_WIDTH(32))
PCRC #(.ADDR_WIDTH(5), .DATA_WIDTH(8))
PCRC #(.ADDR_WIDTH(5), .DATA_WIDTH(16))
PCRC #(.ADDR_WIDTH(5), .DATA_WIDTH(32))

As discussed herein, by selecting and verifying one class representative from each of the six equivalence classes, configurable module 400's entire parameter state space is verified.

Figure 5:
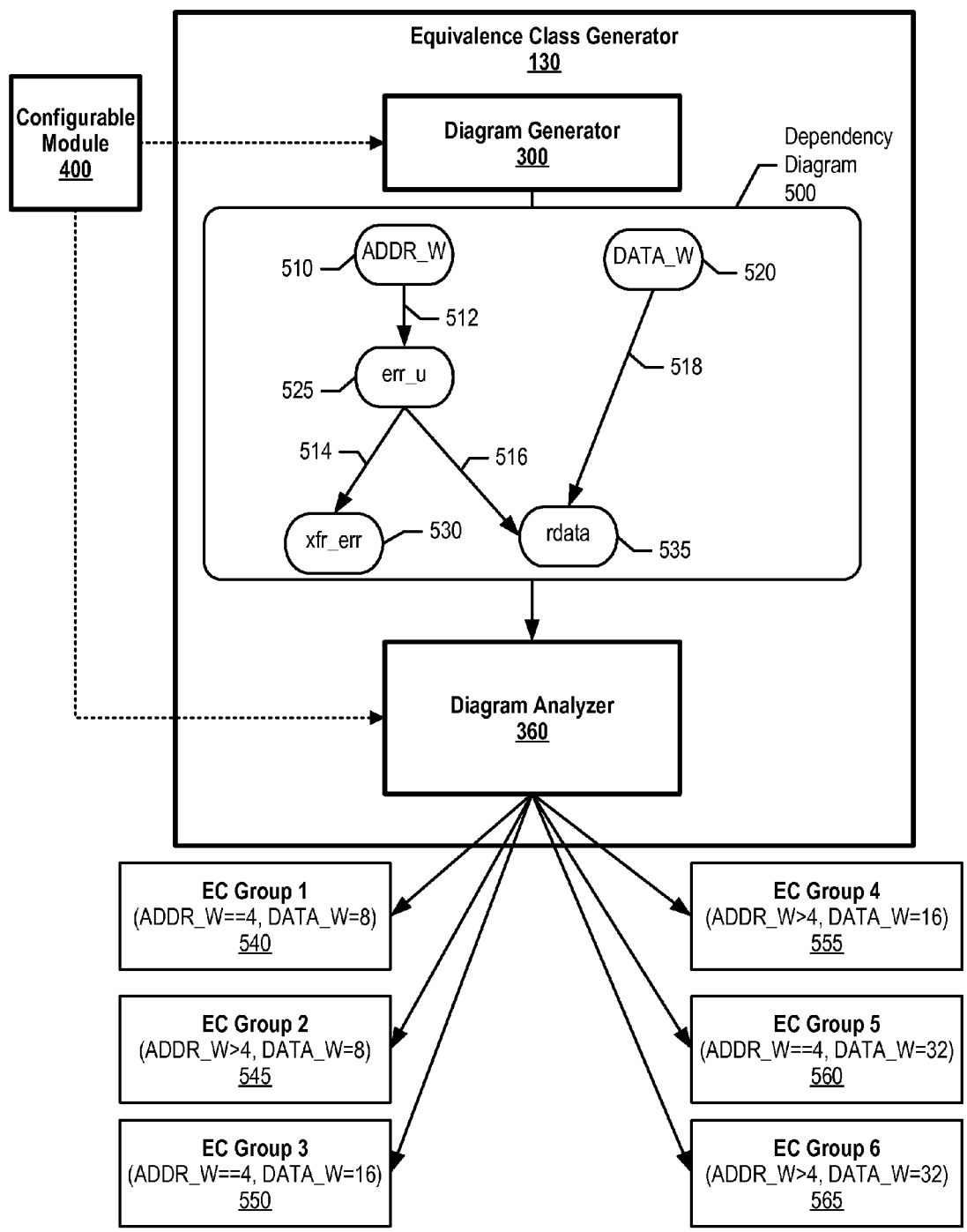
FIG. 5 is an exemplary diagram showing an equivalence class generator creating a dependency diagram for a CRC module and utilizing the dependency diagram to generate equivalence classes.

FIG. 5 is an exemplary diagram showing an equivalence class generator creating a dependency diagram for a CRC module and utilizing the dependency diagram to generate equivalence classes. Diagram generator 300 generates dependency diagram from configurable module 400. Dependency diagram 500 includes two input nodes 510 and 520, which correspond to parameters 410 shown in FIG. 4. Dependency diagram 500 also includes control point 525, which corresponds to the if else statement corresponding to line 420 shown in FIG. 4. Dependency diagram 500 also includes two output nodes 530 and 535, which correspond to the outputs under verification. Edges 512, 514, 516, and 518 correspond to conditions inside configurable module 400.

In turn, diagram analyzer 360 analyzes dependency diagram 500 and generates equivalence classes 540, 545, 550, 555, 560, and 565 accordingly. In one embodiment, diagram analyzer 360 computes conditions on diagram 500 to identify candidate equivalence class, and then computes recursive functions for outputs using parameters. In this embodiment, a theorem prover module may be used to prove that inside an equivalence class, outputs of the circuits may be constructed recursively on parameter. For example, when DATA_W=8, and ADDR_W>4, the theorem prover module may recursively construct xfr_err and rdata based on parameters, such as xfr_err (ADDR_W+1)=xfr_err(ADDR_W, . . . ).

Figure 6:
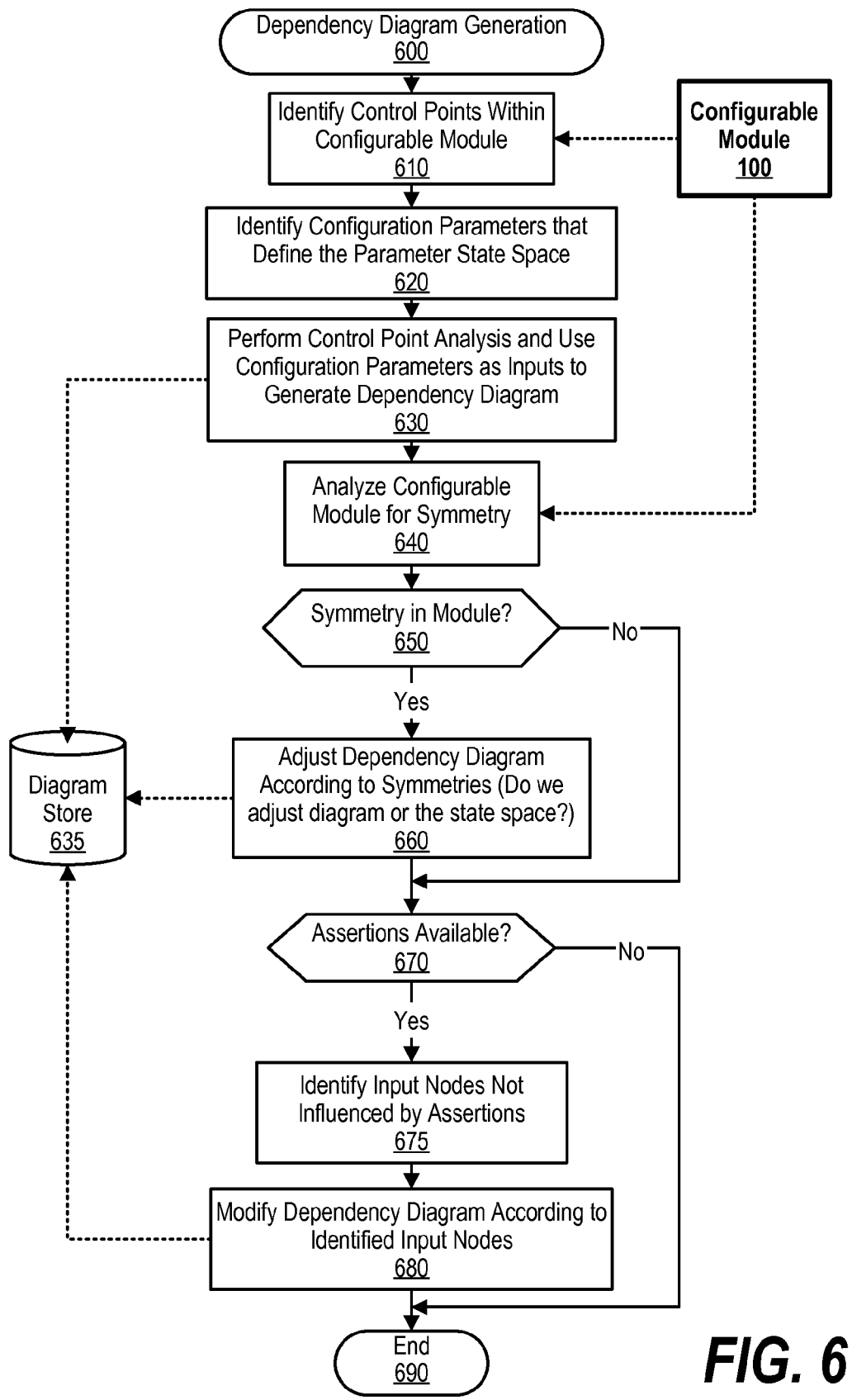
FIG. 6 is an exemplary flowchart showing steps taken in generating a dependency diagram from a configurable module.

FIG. 6 is an exemplary flowchart showing steps taken in generating a dependency diagram from a configurable module. Processing (e.g., equivalence class generator 130 shown in FIG. 1) commences at 600, whereupon processing identifies control points included in configurable module 100 at step 610. In one embodiment, control points may include "if" statements from which recursive functions are generated, such as the example shown in FIG. 2. In another embodiment with configurable modules written in System Verilog or VHDL, control points may be indicated by "generate" statements.

At step 620, processing identifies configuration parameters in configurable module 100 that defines configurable module 100's parameter state space. For example, configurable module 100 may include two configuration parameters with two different ranges (e.g., configuration parameters 210 shown in FIG. 2). In this example, the parameter state space may include each combination of the parameter values.

Next, at step 630, processing uses the configuration parameters as inputs to perform control point analysis to generate a dependency diagram. In one embodiment, control points analysis includes tracking output behavior as parameters and other variables change in order to compute the dependency between the parameters and the outputs. A dependency diagram, such as that shown in FIGS. 3 and 5, identify input nodes, output nodes, and edges (control points) that link the input nodes to the output nodes (e.g., dependencies). In one embodiment, instead of or in addition to generating a dependency diagram, processing may generate a dependency table or some other mechanism to associate input nodes to output nodes.

At step 640, processing analyzes configuration module 100 for symmetry, such as by using logic equivalence. A determination is made as to whether configuration module 100 includes symmetric components (decision 650). If symmetric components exist, decision 650 branches to the "Yes" branch, whereupon processing adjusts the dependency diagram according to the symmetric components at step 660. For example, a bus may have a "bit width" defined as a parameter and, when the analysis identifies symmetry between certain bits inside the bus, the symmetric bits may be compressed to one bit. In this example, if all bits are symmetric, the bus may be compressed to one bit, thus ignoring the parameter. On the other hand, if configuration module 100 does not include symmetric components, decision 650 branches to the "No" branch, bypassing step 660.

A determination is made as to whether there are assertions that correspond to configurable module 100 (decision 670). In one embodiment, processing may utilize an ABV (Assertion-Based Verification) approach, in which case processing may leverage existing assertions to reduce the verification space for parameters. In this embodiment, if a parameter does not effect a sequential cone of influence of each signal inside an assertion, then the parameter is not required for the assertion and, therefore, verification may utilize any value for this parameter. For example, assuming a configurable module includes assertions on each bit of a bus and the width of the bus is controlled by a parameter. In this example, if symmetric components are identified for bits of the bus, representative bits may be utilized to reduce the size of the bus and the number of assertions.

If there are assertions available, decision 670 branches to the "Yes" branch, whereupon processing identifies input nodes that are not influenced by the assertions (step 675). For example, the assertions may assert input signals x and y, but not assert signal z. At step 680, processing modifies the dependency diagram according to the identified input nodes that are not influenced by the assertions. Using the example above, processing may remove dependencies of signal z from the dependency diagram. Dependency diagram generation ends at 690.

Figure 7:
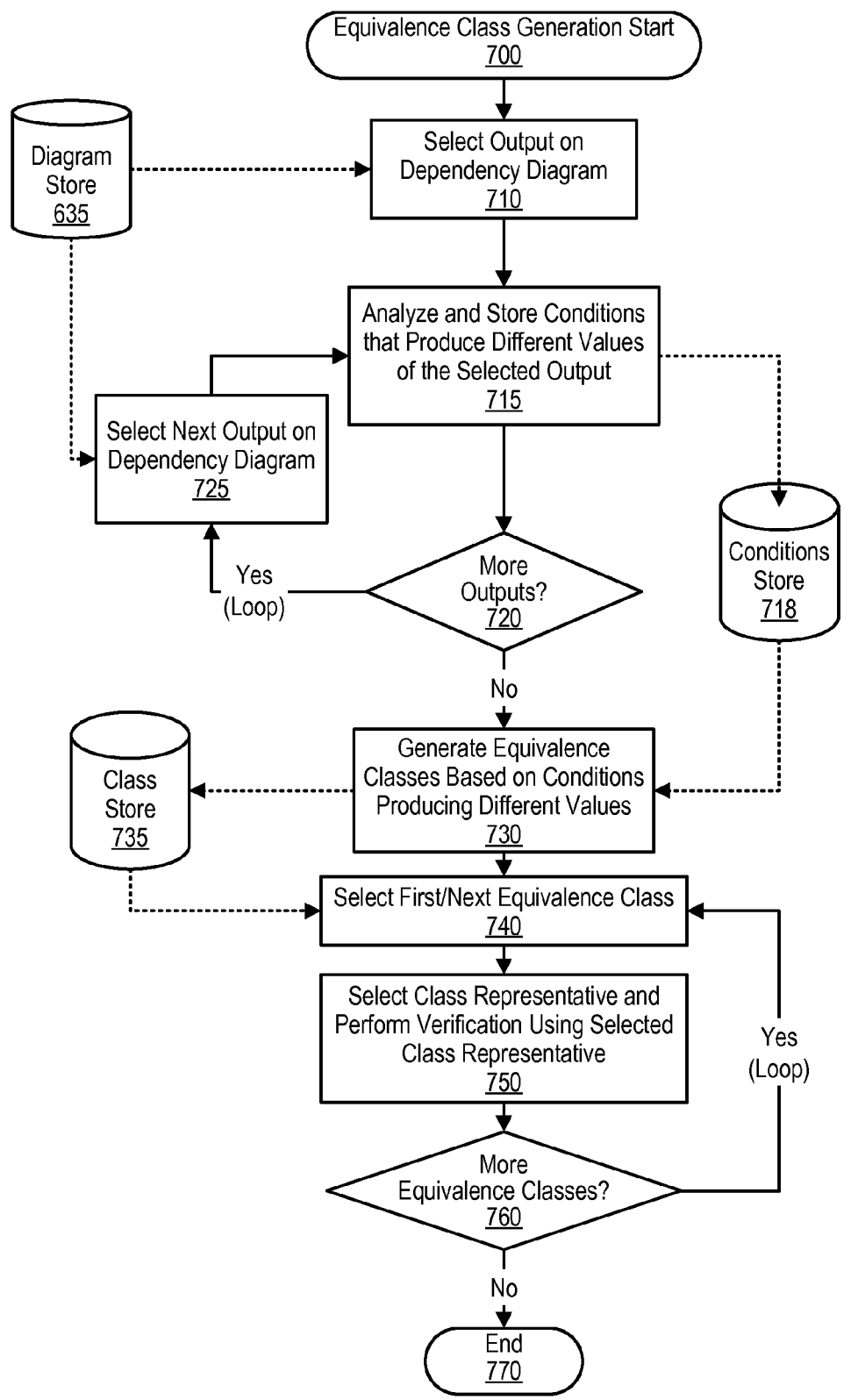
FIG. 7 is an exemplary flowchart showing steps taken in generating equivalence classes and verifying a configurable module based upon the generated equivalence classes.

FIG. 7 is an exemplary flowchart showing steps taken in generating equivalence classes and verifying a configurable module based upon the generated equivalence classes. Processing (e.g., equivalence class generator 130 shown in FIG. 1) commences at 700, whereupon processing selects an output node on the dependency diagram stored in diagram store 635 (step 700). Next, processing analyzes and stores conditions (conditions store 718) that produce different values of the selected output (step 715). For example, referring to FIGS. 2 and 3, "count" may be 0 or increased by 1 based on various conditions. When the current count is equal to LEN-1, the next value of count is reset to 0, otherwise it is increased by 1 (if the addition overflows, count is reset to 0). As such, if (count==LEN-1) or (count==$2^{SIZE}$-1), the next value of count is 0. Otherwise, the next value of count is count+1.

A determination is made as to whether there are more output nodes in the selected dependency diagram (decision 720). If there are more outputs, decision 720 branches to the "Yes" branch, which loops back to select (step 725) and process the next output node. This looping continues until there are no more output nodes to process, at which point decision 720 branches to the "No" branch.

At step 730, processing generates and stores (class store 735) equivalence classes based upon the conditions stored that produce different results (see FIG. 2 and corresponding text for further details). Processing, at step 740, selects the first equivalence class included in class store 735. At step 750, processing selects a class representative (includes specific configuration parameter values) from the selected equivalence class and verifies the configuration module using the class representative.

A determination is made as to whether there are more equivalence classes (decision 760). If there are more equivalence classes, decision 760 branches to the "Yes" branch, which loops back to select and process the next equivalence class by selecting a class representative and verifying the configurable module using the selected class representative. This looping continues until there are no more equivalence classes to verify, at which point decision 760 branches to the "No" branch and processing ends at 770.

Figure 8:
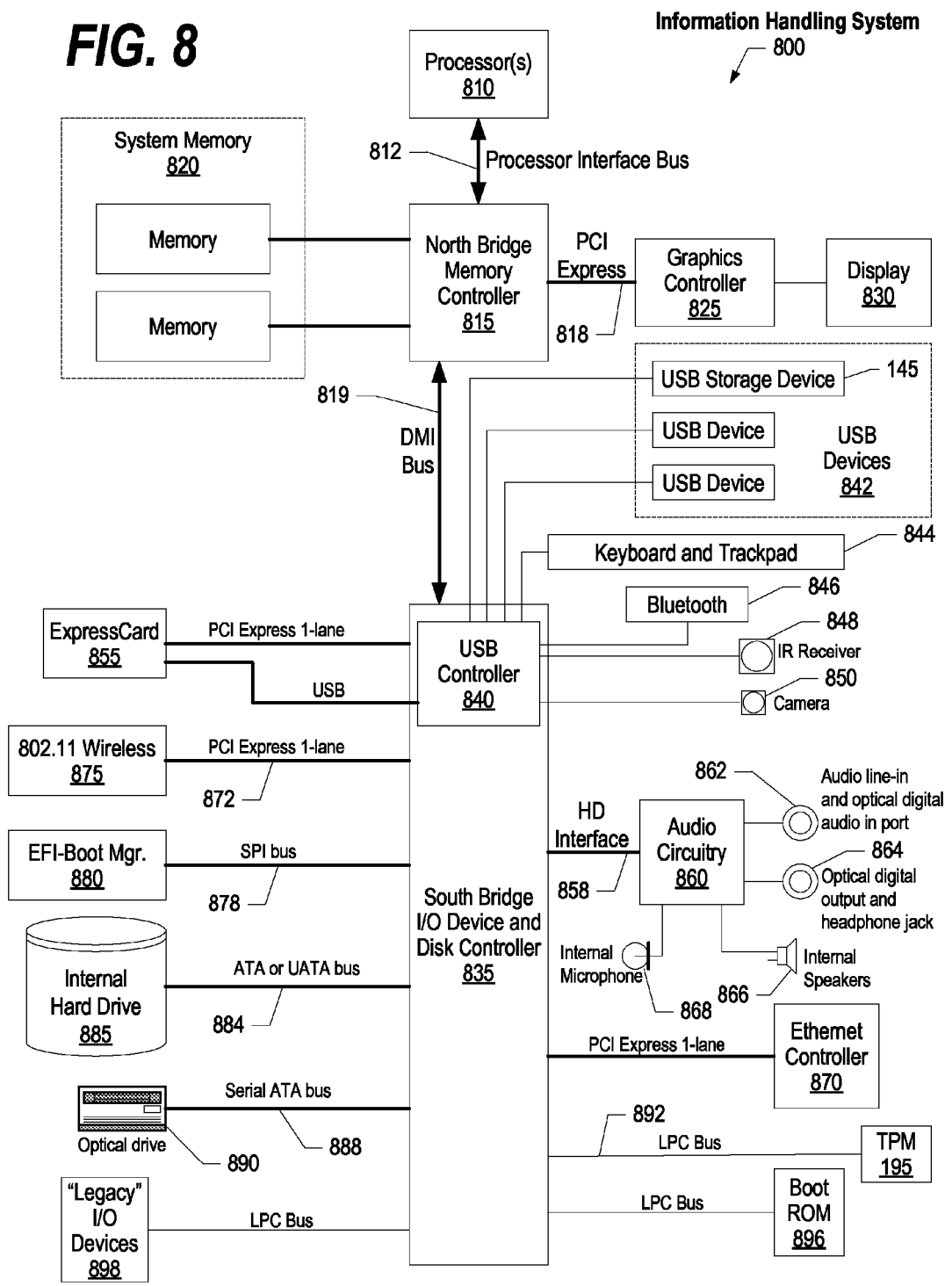
FIG. 8 is a block diagram of a data processing system in which the methods described herein can be implemented.

FIG. 8 illustrates information handling system 800, which is a simplified example of a computer system (e.g., equivalence class generator 130 shown in FIG. 1) capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH).

Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
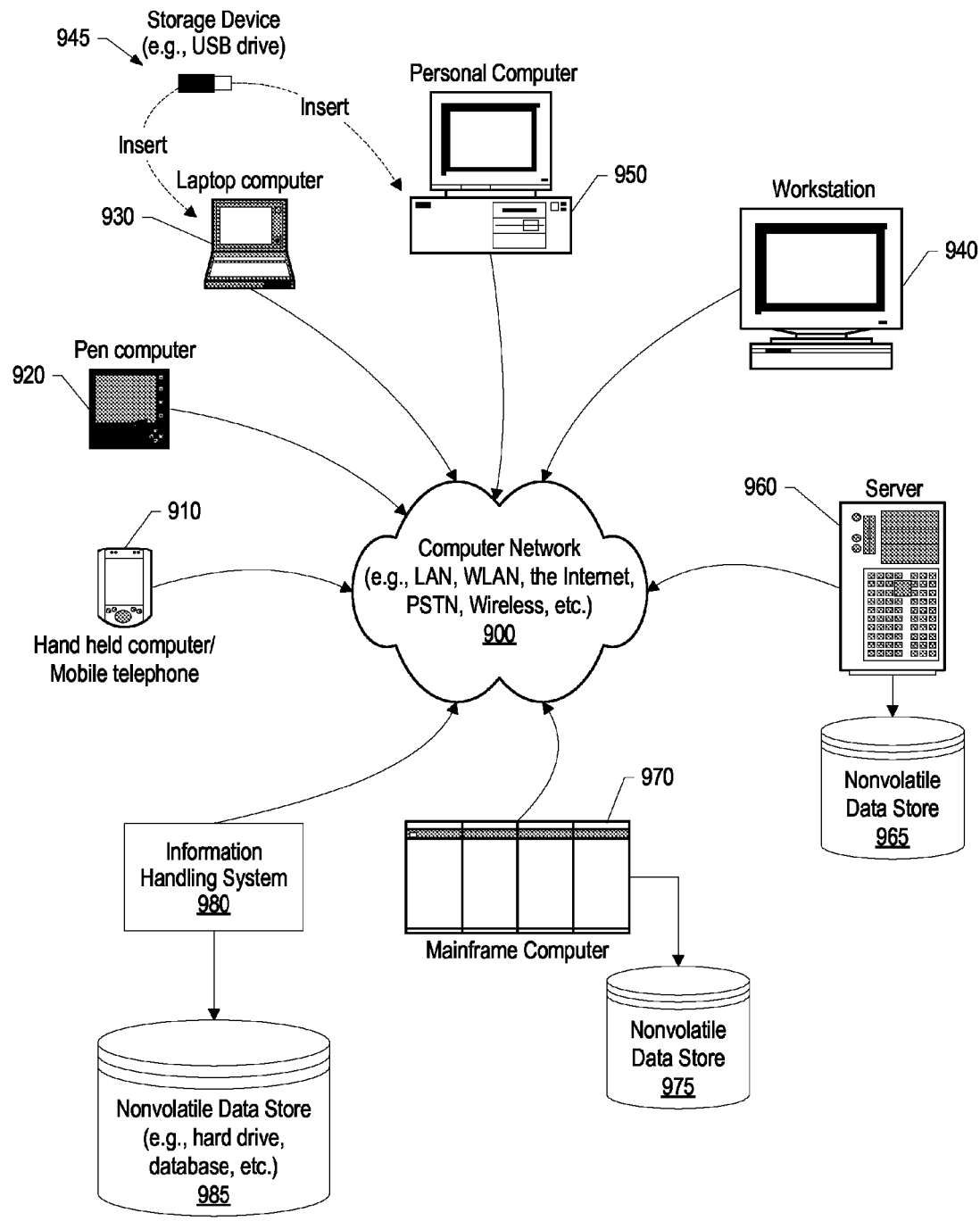
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   selecting, by one or more processors, a configurable module that includes one or more control points and one or more configuration parameters, wherein the one or more configuration parameters define a parameter state space of the configurable module;
   determining, by one or more of the processors, one or more dependencies between the one or more control points and the one or more configuration parameters, wherein the one or more control points depend upon the one or more configuration parameters;
   selecting a first control point of the one or more control points, wherein the first control point has a dependency upon at least one configuration parameter;
   determining one or more parameter conditions of the at least one configuration parameter that produce different values of the first control point;
   generating, by one or more of the processors, a plurality of equivalence classes utilizing the one or more parameter conditions, wherein each of the plurality of equivalence classes includes a plurality of class members that each include one or more parameter values corresponding to the one or more parameter conditions of the at least one configuration parameter;
   selecting, by one or more of the processors, one of the plurality of class members from each of the plurality of equivalence classes, resulting in a plurality of class representatives; and
   verifying each of the plurality of class representatives by one or more of the processors, wherein the verifying verifies the parameter state space of the configurable module.

2. The method of claim 1 wherein the plurality of equivalence classes partition the parameter state space into a plurality of parameter state sub-spaces, wherein each of the plurality of parameter state sub-spaces are identified by one or more parameter values corresponding to the one or more configuration parameters.

3. The method of claim 2 further comprising:
   generating, by the one or more processors, a dependency diagram that includes one or more input nodes and one or more edges that link the one or more input nodes to one or more output nodes, the one or more input nodes corresponding to the one or more configuration parameters and the or more edges corresponding to the one or more control points; and
   utilizing the dependency diagram to generate the plurality of equivalence classes.

4. The method of claim 2 further comprising:
   determining whether the configurable module includes symmetric circuit generation;
   in response to determining that the configurable module includes symmetric circuit generation, removing one or more of the parameter state sub-spaces from the verification of the parameter state space of the configurable module.

5. The method of claim 2 further comprising:
   determining whether one or more assertions are available that correspond to the verification of the configurable module;
   in response to determining that the one or more assertions are available, identifying one or more of the parameter state sub-spaces that fail to be effected by one or more of the configuration parameters; and
   removing the identified one or more parameter state sub-spaces from the verification of the parameter state space of the configurable module.

6. The method of claim 1 wherein the configurable module is a synthesizable register-transfer level (RTL) module that generates a hardware description language (HDL) file according to one or more selection values of the one or more configuration parameters.

7. The method of claim 6 further comprising:
   selecting a different class representative from one or more of the plurality of equivalence classes; and
   generating the HDL file utilizing the different class representative.

8. An information handling system comprising:
   one or more processors;
   a memory coupled to at least one of the processors;
   a set of computer program instructions stored in the memory and executed by at least one of the processors in order to perform actions of:
   selecting, by one or more of the processors, a configurable module that includes one or more control points and one or more configuration parameters, wherein the one or more configuration parameters define a parameter state space of the configurable module;
   determining, by one or more of the processors, one or more dependencies between the one or more control points and the one or more configuration parameters, wherein the one or more control points depend upon the one or more configuration parameters;
   selecting a first control point of the one or more control points, wherein the first control point has a dependency upon at least one configuration parameter;
   determining one or more parameter conditions of the at least one configuration parameter that produce different values of the first control point;
   generating, by one or more of the processors, a plurality of equivalence classes utilizing the one or more parameter conditions, wherein each of the plurality of equivalence classes includes a plurality of class members that each include one or more parameter values corresponding to the one or more parameter conditions of the at least one configuration parameter;
   selecting, by one or more of the processors, one of the plurality of class members from each of the plurality of equivalence classes, resulting in a plurality of class representatives; and verifying each of the plurality of class representatives by one or more of the processors, wherein the verifying verifies the parameter state space of the configurable module.

9. The information handling system of claim 8 wherein the plurality of equivalence classes partition the parameter state space into a plurality of parameter state sub-spaces, wherein each of the plurality of parameter state sub-spaces are identified by one or more parameter values corresponding to the one or more configuration parameters.

10. The information handling system of claim 9 wherein the set of instructions, when executed by at least one of the processors, further performs actions of:
generating, by the one or more processors, a dependency diagram that includes one or more input nodes and one or more edges that link the one or more input nodes to one or more output nodes, the one or more input nodes corresponding to the one or more configuration parameters and the or more edges corresponding to the one or more control points; and
utilizing the dependency diagram to generate the plurality of equivalence classes.

11. The information handling system of claim 9 wherein the set of instructions, when executed by at least one of the processors, further performs actions of:
determining whether the configurable module includes symmetric circuit generation;
in response to determining that the configurable module includes symmetric circuit generation, removing one or more of the parameter state sub-spaces from the verification of the parameter state space of the configurable module.

12. The information handling system of claim 9 wherein the set of instructions, when executed by at least one of the processors, further performs actions of:
determining whether one or more assertions are available that correspond to the verification of the configurable module;
in response to determining that the one or more assertions are available, identifying one or more of the parameter state sub-spaces that fail to be effected by one or more of the configuration parameters; and
removing the identified one or more parameter state sub-spaces from the verification of the parameter state space of the configurable module.

13. The information handling system of claim 8 wherein the configurable module is a synthesizable RTL module that generates an HDL file according to one or more selection values of the one or more configuration parameters.

14. The information handling system of claim 13 wherein the set of instructions, when executed by at least one of the processors, further performs actions of:
selecting a different class representative from one or more of the plurality of equivalence classes; and
generating the HDL file utilizing the different class representative.

15. A computer program product stored in a computer readable storage medium, comprising computer program code that, when executed by an information handling system, causes the information handling system to perform actions comprising:
selecting, by one or more processors, a configurable module that includes one or more control points and one or more configuration parameters, wherein the one or more configuration parameters define a parameter state space of the configurable module;

determining, by one or more of the processors, one or more dependencies between the one or more control points and the one or more configuration parameters, wherein the one or more control points depend upon the one or more configuration parameters;
selecting a first control point of the one or more control points, wherein the first control point has a dependency upon at least one configuration parameter;
determining one or more parameter conditions of the at least one configuration parameter that produce different values of the first control point;
generating, by one or more of the processors, a plurality of equivalence classes utilizing the one or more parameter conditions, wherein each of the plurality of equivalence classes comprises a plurality of class members that each include one or more parameter values corresponding to the one or more parameter conditions of the at least one configuration parameter;
selecting, by one or more of the processors, one of the plurality of class members from each of the plurality of equivalence classes, resulting in a plurality of class representatives; and
verifying each of the plurality of class representatives by one or more of the processors, wherein the verifying verifies the parameter state space of the configurable module.

16. The computer program product of claim 15 wherein the plurality of equivalence classes partition the parameter state space into a plurality of parameter state sub-spaces, wherein each of the plurality of parameter state sub-spaces are identified by one or more parameter values corresponding to the one or more configuration parameters.

17. The computer program product of claim 16 wherein computer readable storage medium stores additional instructions that, when executed by the information handling system, cause the information handling system to perform additional actions comprising:
generating, by the one or more processors, a dependency diagram that includes one or more input nodes and one or more edges that link the one or more input nodes to one or more output nodes, the one or more input nodes corresponding to the one or more configuration parameters and the or more edges corresponding to the one or more control points; and
utilizing the dependency diagram to generate the plurality of equivalence classes.

18. The computer program product of claim 16 wherein computer readable storage medium stores additional instructions that, when executed by the information handling system, cause the information handling system to perform additional actions comprising:
determining whether the configurable module includes symmetric circuit generation;
in response to determining that the configurable module includes symmetric circuit generation, removing one or more of the parameter state sub-spaces from the verification of the parameter state space of the configurable module.

19. The computer program product of claim 16 wherein computer readable storage medium stores additional instructions that, when executed by the information handling system, cause the information handling system to perform additional actions comprising:
determining whether one or more assertions are available that correspond to the verification of the configurable module;

in response to determining that the one or more assertions are available, identifying one or more of the parameter state sub-spaces that fail to be effected by one or more of the configuration parameters; and removing the identified one or more parameter state sub-spaces from the verification of the parameter state space of the configurable module.

20. The computer program product of claim 15 wherein the configurable module is a synthesizable RTL module that generates an HDL file according to one or more selection values of the one or more configuration parameters.

* * * * *